F. W. PUTNAM.
DEFLATION INDICATOR.
APPLICATION FILED APR. 1, 1911.
1,087,979.
Patented Feb. 24, 1914.
3 SHEETS—SHEET 1.
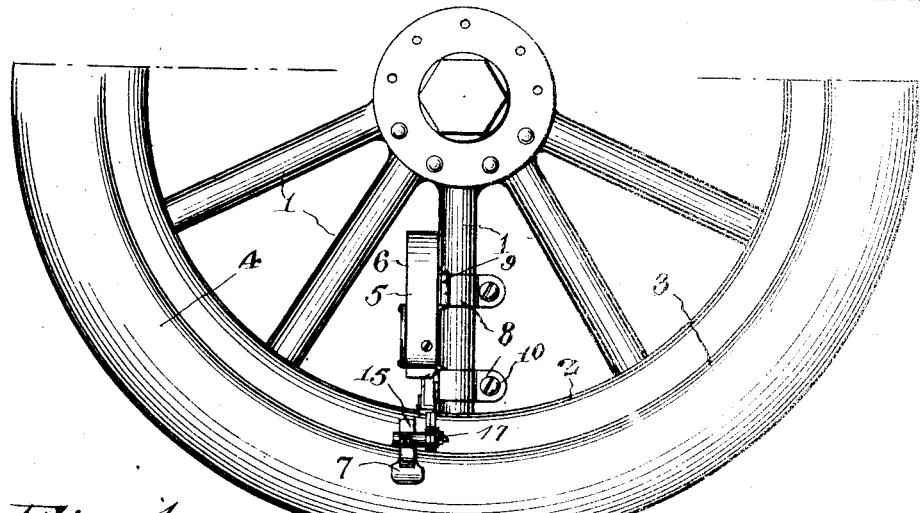
Fig. 1.
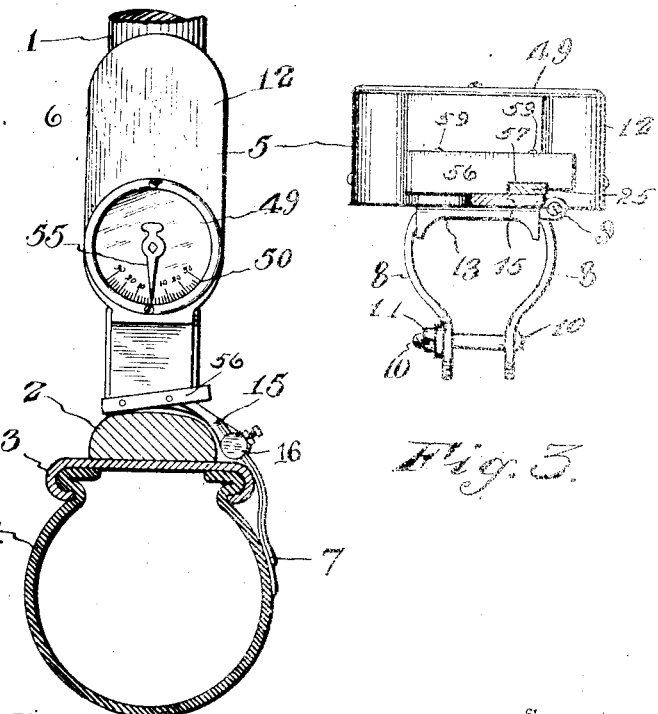
Fig. 2.
Fig. 3.
Witnesses
J. Milton Jester
B. W. Ashburn
Inventor
F. W. Putnam
By
C. L. Parker
Attorney

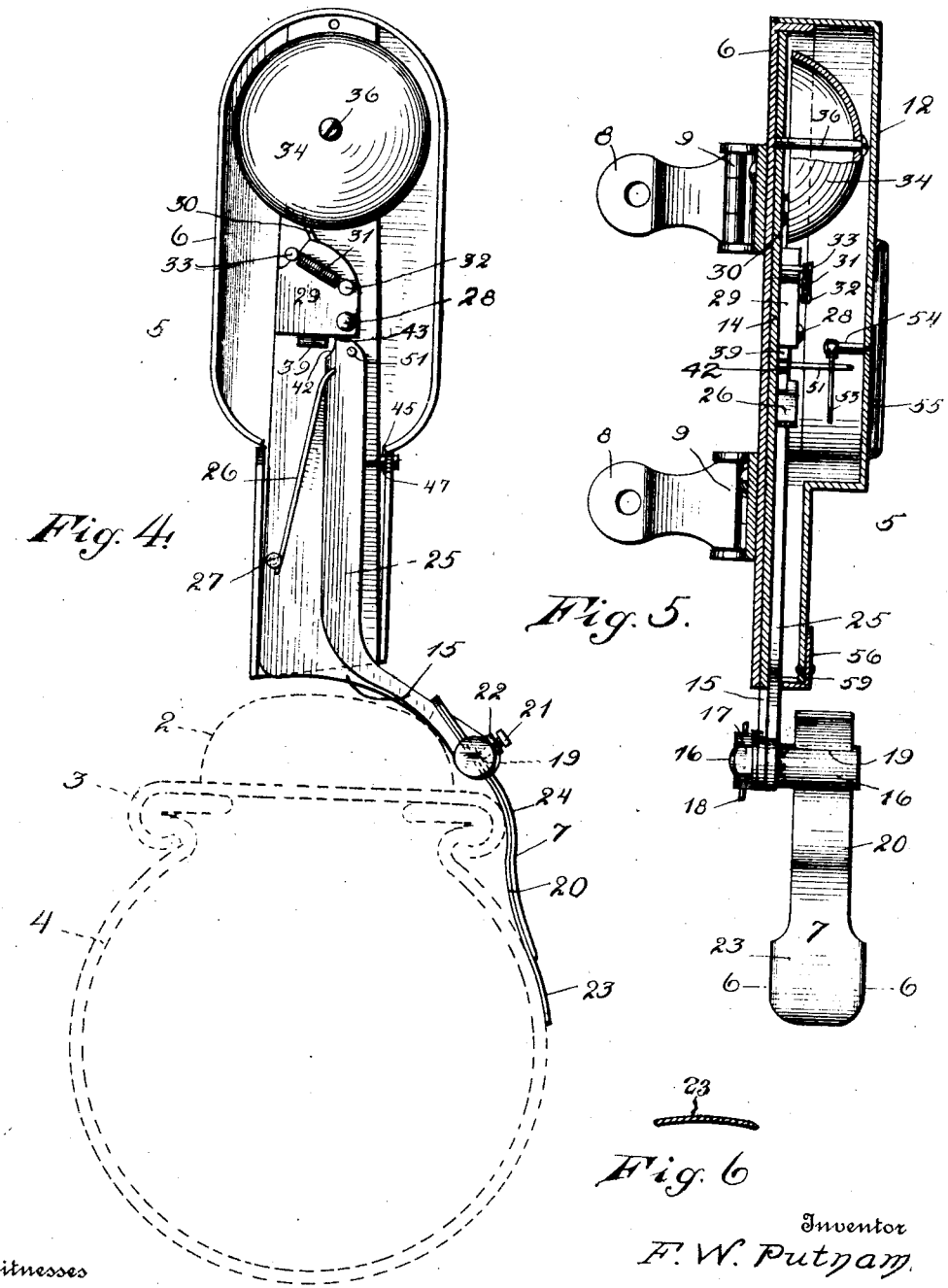

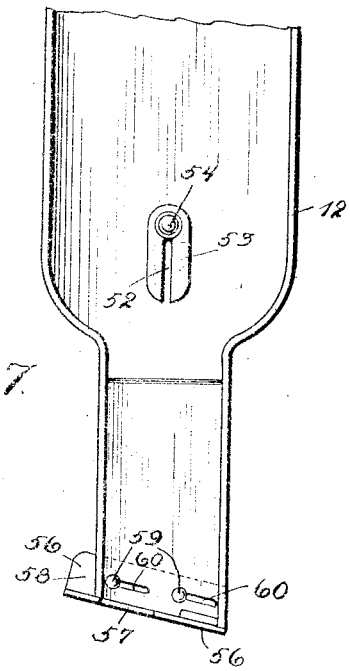
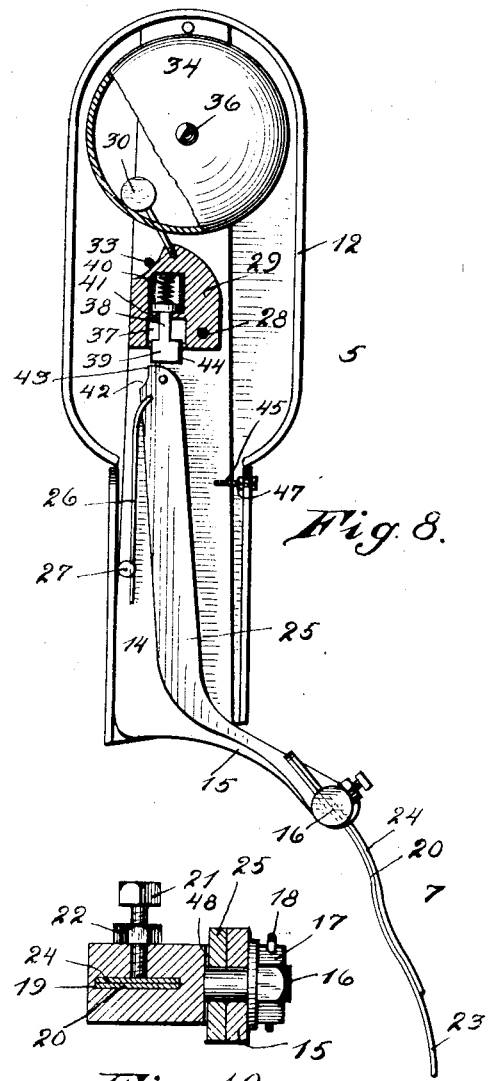
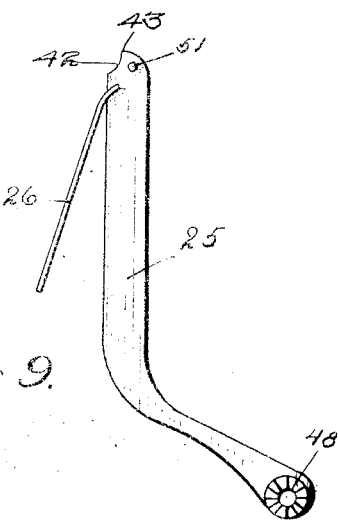

UNITED STATES PATENT OFFICE.

FRANKLIN W. PUTNAM, OF BINGHAMTON, NEW YORK.

DEFLATION-INDICATOR.

1,087,979.  Specification of Letters Patent.  Patented Feb. 24, 1914.

Application filed April 1, 1911. Serial No. 618,352.

*To all whom it may concern:*

Be it known that I, FRANKLIN W. PUTNAM, a citizen of the United States, residing at Binghamton, in the county of Broome and State of New York, have invented certain new and useful Improvements in Deflation-Indicators, of which the following is a specification.

This invention relates to devices for indicating deflation of inflated tires, and has particular reference to a device of this character which will give an audible or visual signal or both, when the tire is wholly or partially deflated.

It is an important object of this invention to provide a deflation indicator which, when mounted upon a vehicle wheel, will operate reliably under the peculiar condition of service incident thereto, embodying rotation, frequently at enormous speed, subjection to sudden and powerful shocks and jolts, and the necessary and frequently violent contact with road materials, such as mud, and clay in various conditions of plasticity, sand, gravel, broken stone, and the like, as well as contact with the sides of ruts or furrows of frozen or otherwise hardened earth.

Another object of this invention is to provide an indicator of the character mentioned, which will be so constructed and disposed on the carrying wheel that it will be protected from injury by road materials of any character or in any condition of surface configuration, as well as any injury by other objects, as curbs, stepping stones, and the like, with which, but for its peculiar structure, it would be likely to come into damaging contact.

Another object of the invention is to provide a deflation indicator by which any degree of injurious deflation, however small, will be indicated with certainty.

Another object of this invention is to provide in an indicator of the character mentioned, means to regulate with certainty, the degree of deflation at which a warning will be given, so that a user may be informed at once when the pressure in his tires falls below a predetermined or desired point.

Another object of this invention is to provide an indicator of the character mentioned, with a supporting structure for the operating parts thereof which will positively insure the maintenance of the relation of the operating parts under even the hardest condition of usage, so that the satisfactory operation of such parts may be relied upon.

Other objects and advantages of this invention will be apparent from the following specification, wherein reference is made to the accompanying drawings, in which like reference characters designate corresponding parts throughout the several views.

Figure 1 is a side view of a portion of a vehicle wheel, showing my deflation indicator mounted in operative position thereon, Fig. 2 is a view partly in section showing a portion of a wheel and tire with my indicator in operative position, Fig. 3 is a top view partly in section showing particularly means for securing it to the spokes of a wheel, Fig. 4 is a front view of the indicator in operative position, with the top portion of the surrounding casing removed to show the operative parts, Fig. 5 is a central longitudinal sectional view of the indicator. Fig. 6 is a cross-sectional view on line 6—6 of Fig. 5, Fig. 7 is a fragmentary view of the indicator casing, showing the sliding dust-excluding closure for the lower end thereof. Fig. 8 is a vertical sectional view taken at right angles to the view shown in Fig. 5. Fig. 9 is a detail view of an operating lever and attached spring, and, Fig. 10 is a detail sectional view showing the lower end of the operating lever, the pivotal support therefor and the holding means for the tire engaging plate.

In the drawings wherein is illustrated a preferred embodiment of my invention, 1 designates the spokes of a vehicle wheel, 2 the felly, 3 the rim, and 4 an inflated tire. Secured to the vehicle wheel, preferably to a spoke 1 thereof, is a deflation indicator 5 comprising a main or body portion 6, and a curved tire engaging element 7. The indicator is preferably secured to a spoke by means of a plurality of pairs of clamps 8, one clamp of each pair being preferably hinged, as shown at 9. The outer or free ends of the clamps are apertured to receive a bolt 10, adapted to receive a clamping nut 11. The clamps are secured to a supporting base to be hereinafter referred to, and a dust-excluding metal casing 12. The inner portion 13 of the clamping elements is stamped into concave form to conform in a greater or lesser extent to the configuration of the spokes with which such parts come into contact.

Within the casing 12 and extending longitudinally thereof is a preferably flat rigid metal plate or bar 14 upon which the operating parts of the indicator are mounted. The lower end of the plate or bar 14 extends to one side and downwardly in the form of a curved projection or extension 15, which is so formed as to conform somewhat closely with the adjacent surface of the felly 2. The extension 15 preferably terminates at the side of the felly and back of the rim 3, as shown. This arrangement serves the important purpose of protecting the extension 15 and the parts mounted thereon from injury by contact with road materials, the sides of ruts, curbs, and the like.

It is to be particularly noted that the extension 15 is in a particularly protected position, being wholly within a vertical projection of the outer portion of the tire 4. The end of the extension 15 is apertured to receive a bolt or stub shaft 16 provided with a securing nut 17, which is preferably provided with a cotter pin 18 passing through the nut and an aperture in the bolt or shaft 16. The end of the bolt or shaft 16 opposite the nut 17 is provided with a slot or recess 19 for the reception of a tire engaging plate 20. The plate 20 is secured within the recess 19 by a set screw or nut 21 preferably provided with a lock nut 22, as shown more particularly in Fig. 10. The tire engaging plate extends beyond the shaft 16 in close proximity to the adjacent edge of the rim 3, thence downwardly into contact with the tire 4 and at its outer portion 23 conforms to the configuration of the adjacent portion of the tire.

By reference to Fig. 6, it will be seen that the edges of the portion of the plate adapted to contact with the tire are flared slightly outwardly to minimize the friction of the plate on the tire. The plate 20 is preferably formed of stiff spring metal, as steel, brass or the like, and is preferably reinforced throughout the greater portion of its length by a plate 24, which conforms in shape thereto. The plate 20 is formed as described, with a particular view to protecting such plate from injury by contact with road materials, the sides of ruts, etc., which would exert a strong tendency to disrupt or displace the said plate if exposed thereto. Particular attention is called to the fact that the plate 20 hugs the rim and tire as closely as possible, all portions of the plate, excepting the free end thereof, being wholly within a vertical projection of the outer portion of the tire. Adjustably secured to the bolt or rock shaft 16 and movable therewith and with the plate 20 is an operating lever 25, extending upwardly along the surface of the supporting plate 14, and terminating approximately midway thereof. This lever is normally maintained in the position shown in Fig. 4 by the tension of a spring 26 secured to the upper portion thereof and bearing against stud 27 carried by the plate. Pivotally secured by a pin 28 to the plate 14 is a striker plate or support 29 carrying a bell clapper 30, as indicated more particularly in Figs. 4 and 8. The pin 28 is disposed at the right lower corner of the plate 29 which is normally maintained in the position shown in Fig. 4 by means of a coil spring 31 secured to a pin 32 carried by the plate 29 and a pin 33 extending outwardly from the plate 14. By reference to Figs. 4 and 8, it will be noted that the pin 33 serves also as a stop to limit the pivotal movement of the plate 29 in one direction, such movement being limited to prevent the striker from normally resting against the side of the gong 34, which is secured to the plate 14 by means of a supporting pin or stud 36. The plate 29 is provided with a vertically extending recess 37 within which is mounted a plunger bar or trip dog 38 having a portion thereof 39 normally extending outside of the plate as indicated in Fig. 8. Disposed between the outward end of the bar or trip dog 38 and at the top of recess 37 is a coil spring 40 normally pressing the bar or dog 38 outwardly. Stop or stops 41 extending into the recess 37 limit the outward movement of the bar or dog 38, as indicated in Fig. 8.

By reference to Fig. 4, it will be noted that the upper end of the operating lever 25 terminates at the side of the outwardly extending portion 39 of the bar or dog 38 and that said portion 39 lies in the path of movement of the lever 25 so that when said lever is moved against the tension of spring 26, it will contact with the outwardly extending portion 39 of the bar or dog 38 and in consequence thereof such movement of the lever 25 will rock the striker plate 29 on its pivot 28 against the tension of spring 31 to move the clapper 30 away from the gong 34. By reference to Fig. 4, it will be noted that the portion of the lever 25 adapted to contact with the bar or dog 38 is cut away at 42 to provide a sharp edge or lip 43 to engage the adjacent side of the bar or dog 38. In the movement of the operating lever 25 the lip 43 engages the side of the bar or dog 38, rocking the striker plate 29 until said lip passes the adjacent lower edge 44 of said bar or dog, whereupon said bar or dog is pressed upwardly against the tension of spring 40, permitting the striker plate to be drawn by the spring 31 into its normal position and thereby bringing the clapper 30 into forcible contact with the gong 34. It is to be noted that the striker plate operates to sound an alarm the instant the lip 43 passes the edge 44 without requiring the lever 25 to move out of the way of the bar or dog 38. A particular advantage of this feature of the invention is that a clearly audible signal is produced by a slight movement of the lever 25.

A comparison of the length of the tire engaging plate 20 with that of the operating lever 25 which, as above stated, is movable therewith, will show that said plate 20 is materially shorter than the lever 25, the effect being that an outward movement of the end 23 of the plate 20 will produce a corresponding but increased movement of the upper end of the lever 25. By this arrangement it is possible to effect the sounding of an alarm upon even a slight degree of deflation of the tire.

Some users prefer to maintain a high pressure in their tires, while others prefer a lesser pressure. I have accordingly provided means for regulating the point at which a signal is sounded in the deflation of tires in connection with which this device is employed. By reference to Fig. 4, it will be noted that I have provided an adjustable stop 45 to limit the movement of the lever 25 under the pressure of spring 26. This stop 45 is preferably a screw-threaded pin placed within a screw-threaded opening in the casing 12. The pin 45 is also preferably provided with a nut 47 to secure it against displacement. Where it is desired that an alarm be sounded upon a slight degree of deflation, the stop 45 is advanced toward the lever 25 to a desired degree which may be regulated to suit the user's requirements. When the stop 45 is adjusted to the desired position, the plate 20 is adjusted into contact with the tire. To effect this adjustment and secure the permanency of the relation between the plate and the operating lever 25, I provide the contacting points of the lever 25 and the abutting portion of the rock shaft 16 with radial serrations 48. When this adjustment is made the nut 17 is screwed up and the adjustment between plate 20 and lever 25 is completed.

It may be desired by some users to know the degree of deflation of their tire or tires and to accomplish this, I have provided a visual indicator 49, provided with graduations 50. Secured at the upper portion of the lever 25 is a pin 51 adapted to engage within the slot 52 of an arm 53 secured to a stub shaft 54 rotatably mounted through the upper portion of the casing 12. The stub shaft 54 extends through the casing 12 and is provided with a hand or indicating arm 55 which is secured thereto by frictional contact so that said hand can be set at any desired position on the stub shaft 54. The hand 55 is provided with means for setting the same in any desired position on the shaft 54 in order that a user may note the deflation from his own standard of pressure so that said hand will not move beyond the zero point on the scale until a tire has become deflated beyond a desired or predetermined point. When the hand has been set as specified, the user can determine, not only the exact degree of deflation, but the degree of deflation, indicated by the movement of the hand beyond the zero point, in excess of any predetermined degree of deflation.

A particular advantage of the visual indicator is that the user can, by bringing the portion of the tire adjacent the arm 20 in conjunction with the ground or floor, determine the degree of deflation of his tires, before using his vehicle, thus enabling him to bring the pressure in the tires up to exactly the desired point.

By reference to Fig. 7 of the drawing, it will be noted that the lower end of the casing 12 is provided with a dust-excluding sliding closure 56 provided with an opening 57 for the passage therethrough of the lever 25. The closure 56 is provided at its side 58 with guide pins 59 movable within slots 60 in the top of the casing 12. By means of this closure, the casing 12 is rendered substantially dust-proof, and the protection of the operative parts of the indicator insured.

While I have shown and described a preferred form of my invention as best illustrating the principle of the invention, and the structure and operation thereof, it is to be understood that my invention is not limited thereto, but that various modifications may be made within the spirit of my invention without departure from the appended claims.

Having thus described my invention, I claim:—

1. In a device of the character described, a rigid plate adapted to be secured between adjacent spokes of a wheel equipped with an inflated tire, said plate having a curved extension extending out of the plane of the spokes adjacent the surface of the felly and conforming approximately in shape thereto, said extension terminating adjacent the felly and back of the rim, a tire engaging plate pivoted to said extension and adapted to extend around the edge of the rim in close proximity thereto and along the tire in contact therewith, signal producing means carried by said support, means to effect the operation of the signal upon the outward movement of said tire engaging plate.

2. In a device of the character described, a supporting plate provided at one end with a laterally extending curved portion adapted to conform to the shape of the felly and terminating wholly behind the rim to be protected thereby, a lever curved intermediate its ends for providing a portion corresponding substantially in shape to the curved portion of said plate, a tire engaging element disposed adjacent the outer end of the lever, common means for pivoting said lever to the outer end of the curved portion of the plate and for rigidly connecting the tire engaging element with the outer end of said lever at different angular positions, and signal producing means suitably mounted upon the plate and operated by said lever.

3. In a device of the character described, a supporting element, means for attaching the same to the spoke of a wheel, a swinging lever, an element passing through the swinging lever and supporting element to pivotally connect the same together and rigidly connected with the swinging lever, and a tire engaging element adjustably mounted upon the second named element, and signal producing means operated by the lever.

4. In a device of the character described, a supporting structure, means for attaching the same to a wheel, a swinging lever, an element pivotally connecting the swinging lever with the supporting structure and having rigid connection with the swinging lever, signal producing means operated by the swinging lever, a tire engaging element longitudinally adjustably mounted on said element, and means to hold the tire engaging element in adjustment at different positions on the first named element.

5. In a device of the character described, a plate to be secured between adjacent spokes of a wheel equipped with an inflated tire, said plate having a curved extension extending out of the plane of the spokes adjacent the surface of the felly and conforming approximately in shape thereto, said extension terminating adjacent the felly and back of the rim, a tire engaging plate pivoted to said extension and adapted to extend around the edge of the rim in close proximity thereto and along the tire in contact therewith, an audible signal connected with the plate, a visual signal connected with the rigid plate, and means to effect the operation of the audible and visual signals upon the outward movement of the tire engaging plate.

6. In a device of the character described, a pivoted element carrying a striker and provided with an opening formed therein, a spring pressed dog mounted in the said opening, and a pivoted lever having one end adapted to engage and trip the spring pressed dog upon movement in one direction, the other end of said lever comprising a tire engaging element, whereby upon the outward movement of said tire engaging element the lever will be rocked on its pivot and the striker carrying element engaged by the said lever and rocked on its pivot, substantially as described.

In testimony whereof I affix my signature in presence of two witnesses.

FRANKLIN W. PUTNAM.

Witnesses:
C. L. PARKER,
THOMAS DURANT.